(12) United States Patent
Cresse et al.

(10) Patent No.: US 7,880,101 B2
(45) Date of Patent: Feb. 1, 2011

(54) MINIATURE ROTARY SWITCH

(76) Inventors: Richard J. Cresse, 29095 Avenue Penn, Valencia, CA (US) 91355; Larry R. Cresse, 29095 Avenue Penn, Valencia, CA (US) 91355

( * ) Notice: Subject to any disclaimer, the term of this patent is extended or adjusted under 35 U.S.C. 154(b) by 505 days.

(21) Appl. No.: 12/052,605

(22) Filed: Mar. 20, 2008

(65) Prior Publication Data
US 2008/0230356 A1   Sep. 25, 2008

Related U.S. Application Data

(60) Provisional application No. 60/896,192, filed on Mar. 21, 2007.

(51) Int. Cl.
*H01H 3/16* (2006.01)
(52) U.S. Cl. .............. 200/61.34; 200/61.27; 200/61.54
(58) Field of Classification Search .............. 200/61.27, 200/61.3, 61.31, 61.34, 61.35, 61.54, 332, 200/335
See application file for complete search history.

(56) References Cited

U.S. PATENT DOCUMENTS

| | | | |
|---|---|---|---|
| 3,201,536 A | 8/1965 | Fisher et al. | |
| 3,364,319 A | 1/1968 | Elliott | |
| 3,557,328 A | 1/1971 | Winogrocki et al. | |
| 4,315,117 A * | 2/1982 | Kokubu et al. | 200/61.27 |
| 4,570,041 A * | 2/1986 | Ishiguro | 200/61.54 |
| 4,647,736 A | 3/1987 | Furuhashi et al. | |
| 4,814,743 A * | 3/1989 | Hanaki | 200/61.39 |
| 2005/0205399 A1* | 9/2005 | Baba et al. | 200/61.54 |

* cited by examiner

*Primary Examiner*—Renee Leubke
*Assistant Examiner*—Lheiren Mae A Caroc
(74) *Attorney, Agent, or Firm*—Christie, Parker & Hale, LLP

(57) ABSTRACT

A single pole, double throw, self-canceling rotary switch for selectively coupling a first circuit to a second or a third circuit by rotating a rotary element to couple or decouple electrical contacts. The rotary switch includes first and second pawls pivotally attached to the rotary element and coupled to one another by a spring. Rotation of the rotary element causes a ramp cam to act on one of the pawls, causing it to pivot, and thereby causing the spring to exert a force on the other pawl, moving a tooth on the other pawl into the locus of rotation of a central shaft that includes a groove. Rotation of the central shaft in one direction has no effect on the position of the rotary element, but rotation of the central shaft in the other direction engages the groove and the tooth, causing the rotary element to decouple the contacts.

19 Claims, 9 Drawing Sheets

MINIATURE ROTARY SWITCH

CROSS-REFERENCE TO RELATED APPLICATION

This application claims priority to and the benefit of U.S. Provisional Patent Application No. 60/896,192, filed in the USPTO on Mar. 21, 2007, the entire content of which is incorporated herein by reference.

BACKGROUND (1) Field of the Invention

The present invention relates to a single pole, double throw switch with a stable off position, and more particularly to a single pole, double throw self-canceling rotary switch with a freely rotating shaft that does not affect the status of the switch when rotating in one direction, and cancels the switch when rotating in the other direction.

(2) Description of Related Art

According to U.S. National Highway and Traffic Safety Division Standard No. 108, part S5.1.1.5, encoded at 49 CFR 571.108, the turn signal operating unit on most motor vehicles must be self-canceling by steering wheel rotation, and capable of cancellation by a manually operated control. Additionally, such devices are nearly universal in motor vehicles equipped with a steering wheel worldwide.

Many implementations of turn signal switches use a single pole, double throw self-canceling switch with a stable off position. In general, an electric switch is a device that includes two or more electrical contacts that are arranged such that they can be selectively moved into and out of contact with each other. Switches can include one or more poles, or electric contacts coupled to single circuit elements. Switches are frequently classified by the number of poles and the number of possible switch positions, or throws, per pole. FIG. 1 schematically illustrates a single pole, double throw switch, in which the pole COM is selectively connected to a first position L1 or a second position L2. Such switches may also include a stable off position, in which the pole COM is neither connected to L1 nor L2.

A typical turn signaling system of an automobile is illustrated in FIG. 2. The system includes a battery 10, an electrical controller 12, a turn signal flasher 14, a turn signal switch 16, a left turn signal 18, and a right turn signal 20. When the automobile is turned on, the electrical controller 12 provides electric power from the battery 10, through a fuse panel, to the turn signal flasher 14. The turn signal switch 16 includes a lever (not illustrated) controlled by the driver of the automobile that, when pushed in one direction, couples the turn signal flasher 14 to the left turn signal 18, and when pushed in the other direction, couples the turn signal flasher 14 to the right turn signal 20. The turn signal switch is usually self-cancelling, meaning that, for example, when the turn signal switch 16 is switched to connect the left turn signal 18, the turn signal switch 16 will return to the off position after a left turn is complete.

SUMMARY

A rotary switch having features according to an exemplary embodiment of the present invention selectively couples a first contact to a second contact or a third contact. The rotary switch includes a rotary element for controllably rotating among at least a first position coupling the first contact to the second contact, and a second position coupling the first contact to the third contact. A first pawl and a second pawl are pivotally attached to the rotary element, and a ramp cam is for acting on the first pawl and the second pawl. Rotation of the rotary element toward the first position causes the ramp cam to act on the first pawl, pivoting the first pawl and exerting a force on the second pawl. Likewise, rotation of the rotary element toward the second position causes the ramp cam to act on the second pawl, pivoting the second pawl and exerting a force on the first pawl.

According to a further embodiment, a central shaft including at least one notch passes through the rotary switch, and the first and second pawl each include a tooth. When the rotary element is in the first position, rotation of the central shaft in a first direction causes the tooth of the second pawl to engage the notch and rotate the rotary element out of the first position. Likewise, when the rotary element is in the second position, rotation of the central shaft in a second direction causes the tooth of the first pawl to engage the notch and rotate the rotary element out of the second position.

The rotary element may further include a third position between the first position and the second position. In the third position, the second contact and the third contact are open. A detent can be used to hold the rotary element in the third position. In the third position, the tooth of the first pawl and the tooth of the second pawl are clear of a locus of rotation of the at least one notch of the central shaft when the rotary element is in the third position.

In a further embodiment, rotation of the central shaft in the second direction when the rotary element is in the second position causes the rotary element to move to the third position. Rotation of the central shaft in the first direction when the rotary element is in the first position causes the rotary element to move to the third position. A spring may be used to couple the first pawl to the second pawl, such that a pivoting motion of one pawl among the first and second pawls exerts a mechanical force tending to pivot the other pawl among the first and second pawls.

In yet a further embodiment, the rotary element remains in the first position when the central shaft rotates in the second direction. Likewise, the rotary element remains in the second position when the central shaft rotates in the first direction. The rotary switch may further include a lever attached to the rotary element for selectively rotating the rotary element between the first position, the second position, and the third position.

In yet a further embodiment, the rotary switch may be used as a turn signal switch in a motor vehicle, for controlling a left turn signal and a right turn signal. Thus, the first position activates the left turn signal, the second position activates the right turn signal, and the third position deactivates the left turn signal and the right turn signal. The central shaft may be coupled to a steering wheel of the motor vehicle.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
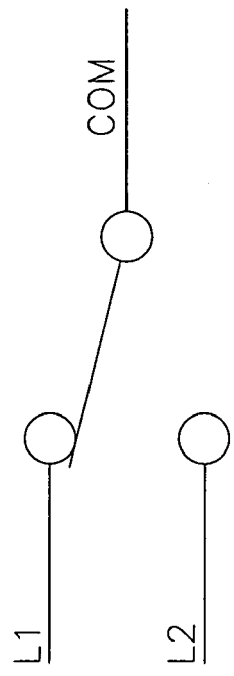
FIG. 1 is a schematic representation of a single pole, double throw switch as in the prior art.
Figure 2:
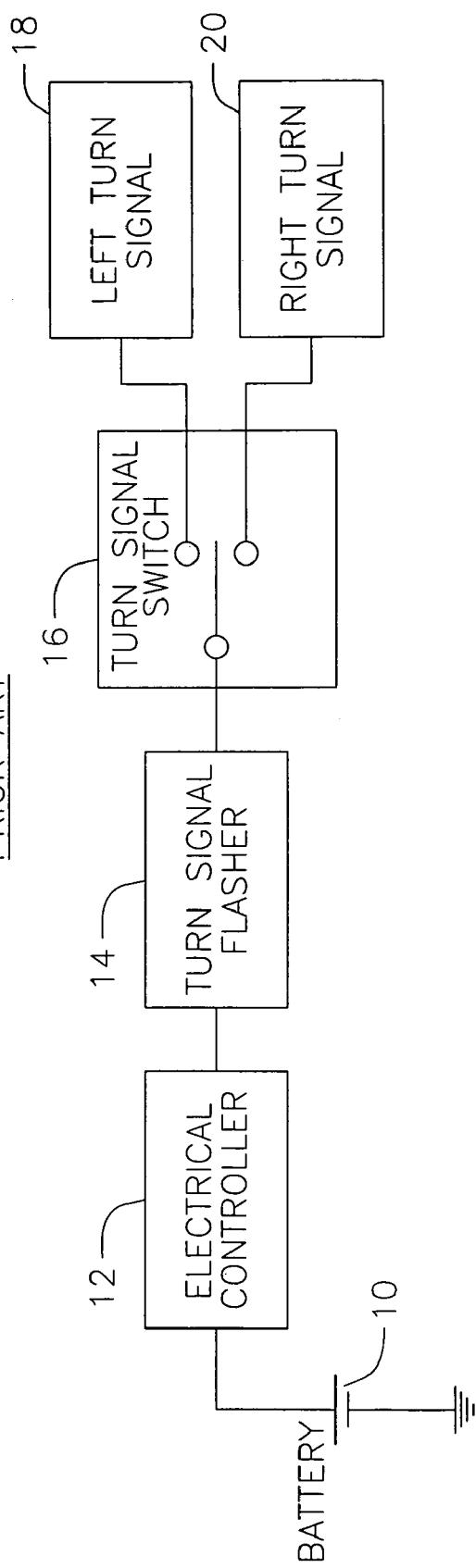
FIG. 2 is a block diagram showing a turn signaling system of a motor vehicle as in the prior art.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "connected" or "coupled" to another element, it can be directly connected or coupled to the another element or be indirectly connected or coupled to the another element with one or more intervening elements interposed therebetween. Like reference numerals designate like elements throughout the specification.

Figure 3:
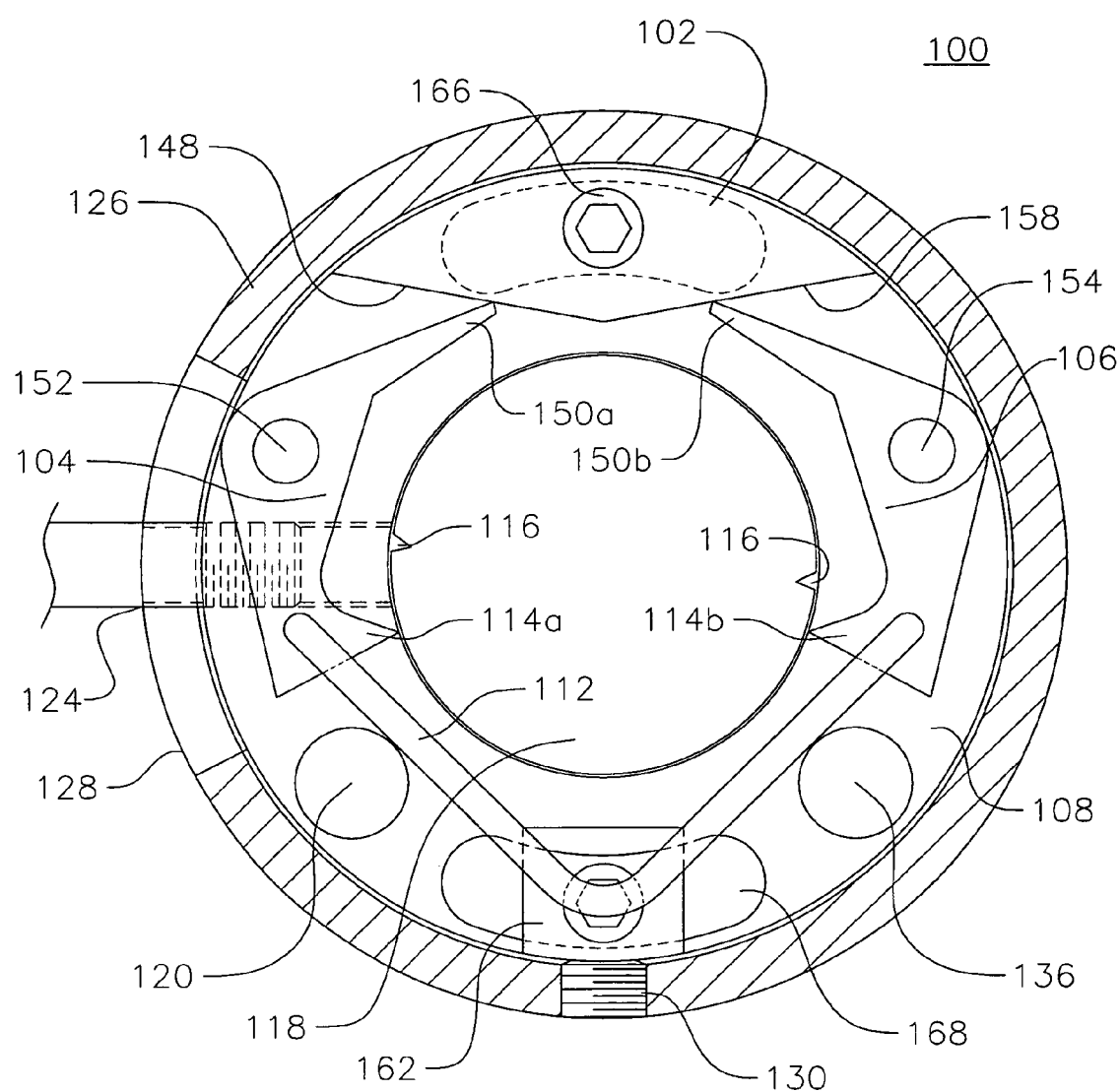
FIG. 3 is a view of a rotary switch in a neutral position according to an exemplary embodiment of the present invention.
Figure 6:
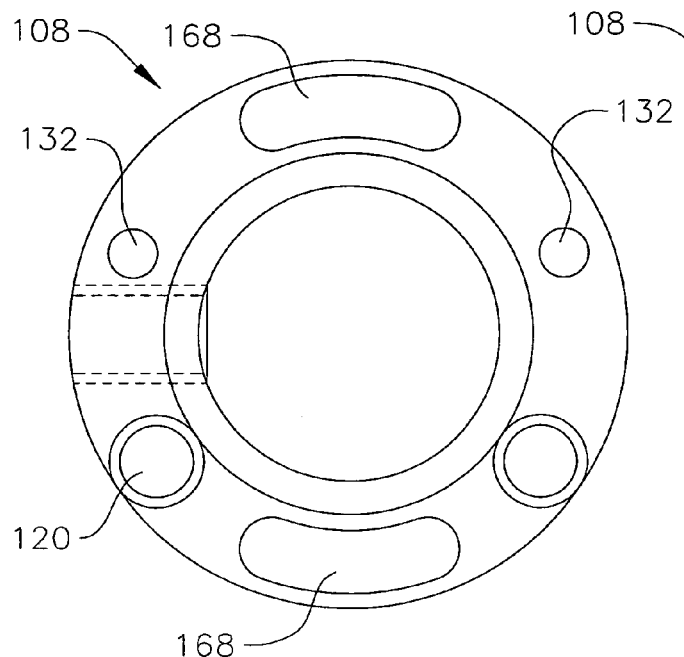
FIGS. 6-8 are views of a rotary element of a rotary switch according to an exemplary embodiment of the present invention.
Figure 7:
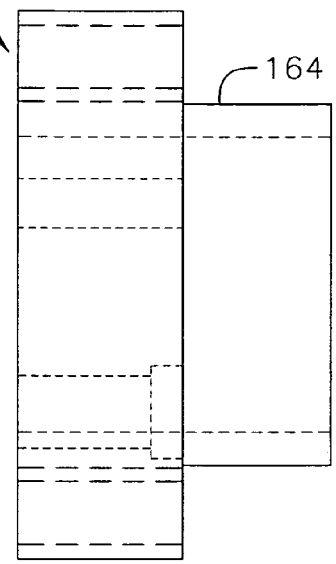
Figure 8:
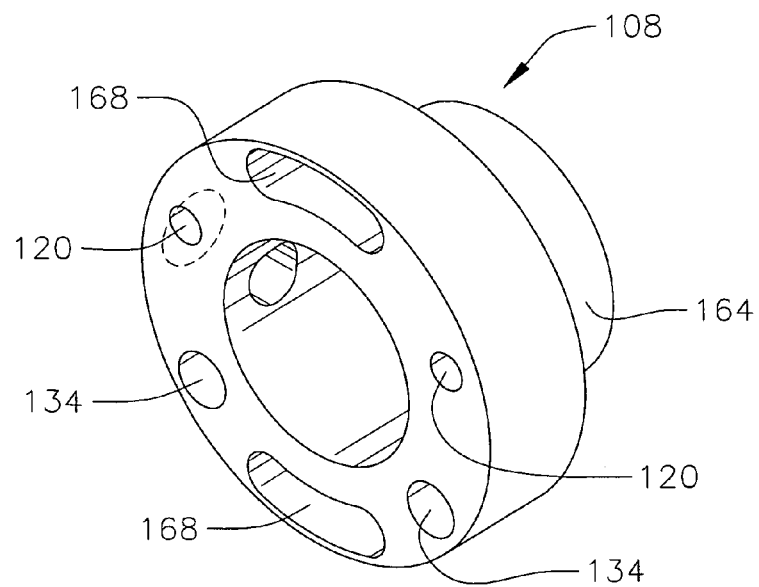
Figure 9:
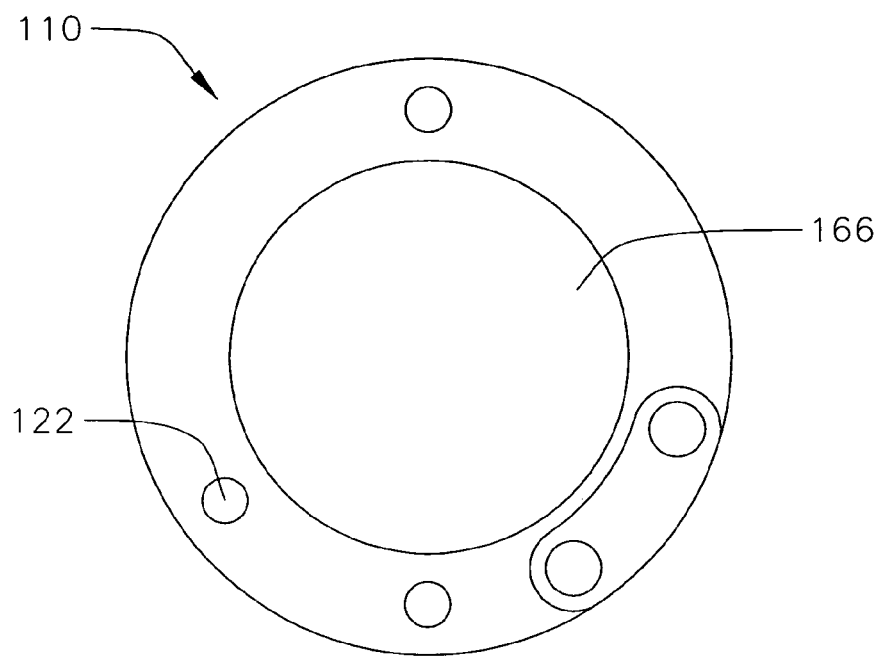
FIG. 9 is a view of a stationary element of a rotary switch according to an exemplary embodiment of the present invention.
Figure 10A:
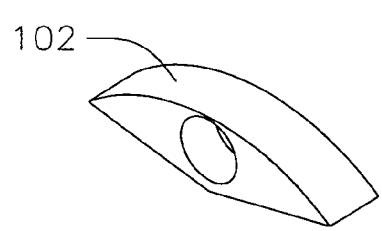
FIG. 10A is a perspective view of a ramp cam according to an exemplary embodiment of the present invention.
Figure 10B:
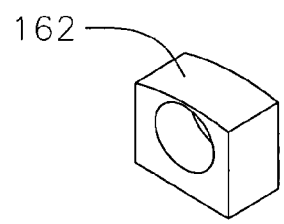
FIG. 10B is a perspective view of a retainer according to an exemplary embodiment of the present invention.
Figure 10C:
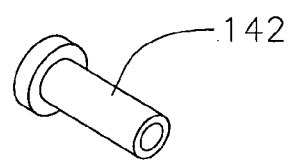
FIG. 10C is a perspective view of an insulator according to an exemplary embodiment of the present invention.
Figure 10D:
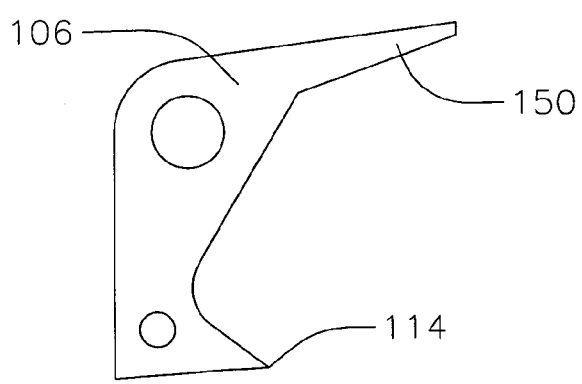
FIG. 10D is a view of a pawl used in a rotary switch according to an exemplary embodiment of the present invention.

A switching mechanism of a single pole, double throw, self-canceling rotary switch according to an exemplary embodiment of the present invention is illustrated in FIG. 3. In this illustration, the rotary switch 100 includes a ramp cam 102, a first pawl 104, a second pawl 106, a rotary element 108, a stationary element 110, and a spring 112. The rotary element 108 may be a rotary plate as illustrated in FIGS. 6-8, or any other suitable rotary element for performing a rotational motion. The stationary element 110 may be a stationary plate as illustrated in FIG. 9, or may include a plurality of stationary elements that are stationary relative to rotational motion of the rotary element 108. The rotary element 108 may be connected to a control lever 124, allowing a user to control the switch 100.

The rotary switch 100 may be positioned within a tube 126 including a slot 128 through which the lever 124 protrudes. The stationary element 110 may be held stationary by a set screw 130 through the tube 126. The rotary element 108 should have a slightly smaller outer diameter than the inner diameter of the tube 126, and should not be rigidly affixed thereto, allowing the rotary element 108 to rotate within the tube 126 without encountering prohibitive friction. A central shaft 118, which may be attached to a steering wheel, is free to rotate within the rotary element 108 and the stationary element 110.

Figure 4A:
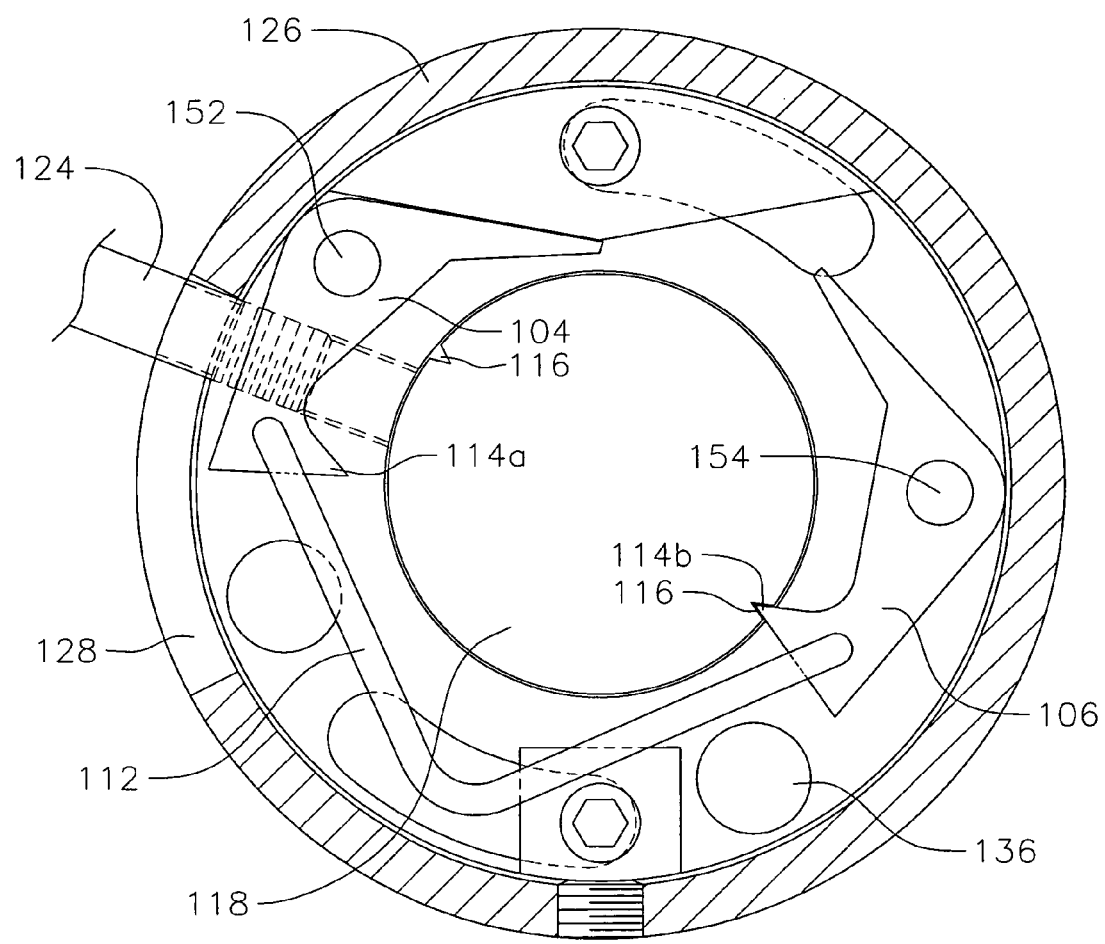
FIGS. 4A-4B are views of a rotary switch in engaged positions according to an exemplary embodiment of the present invention.
Figure 4B:
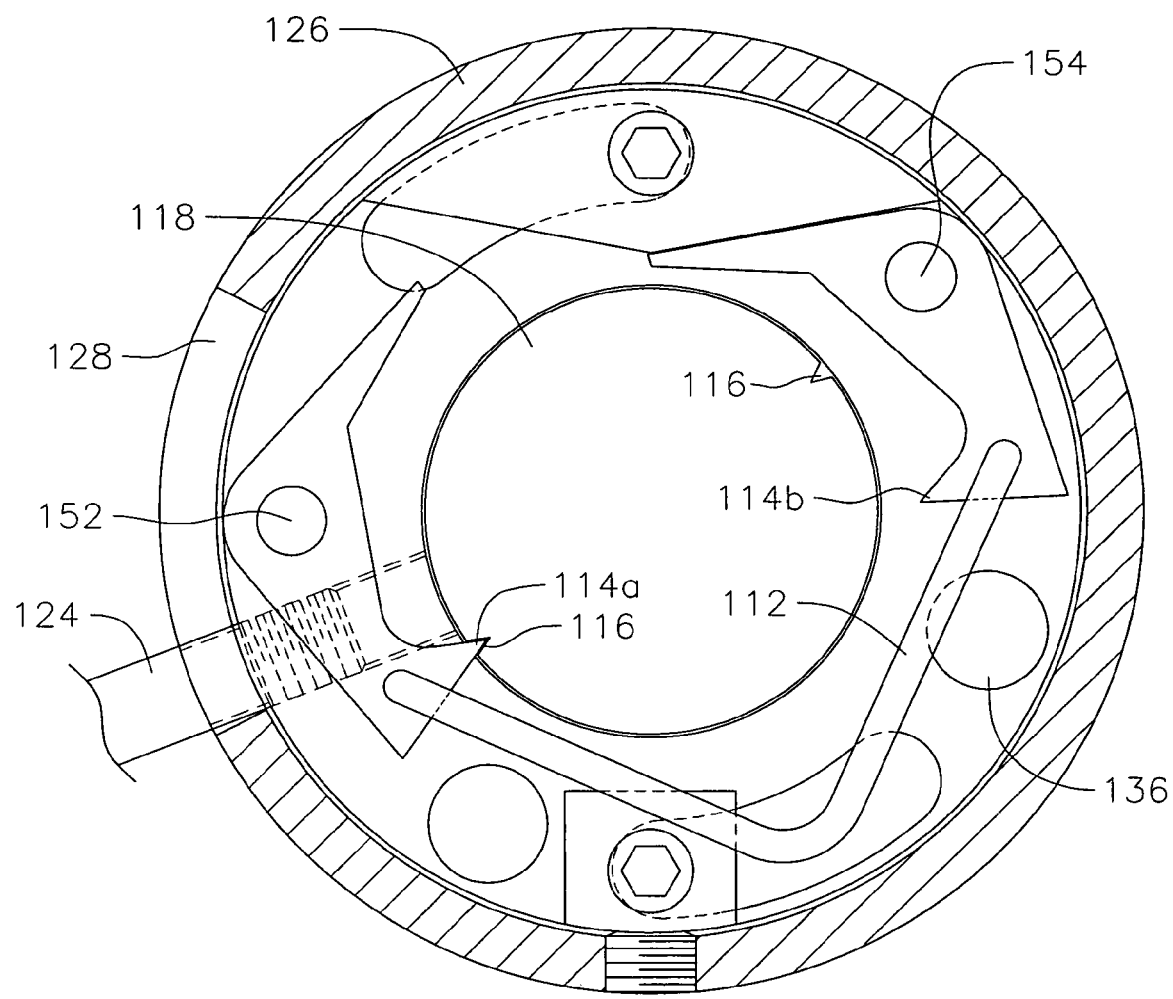

Each pawl 104, 106 includes a tooth 114a, 114b, and a tongue 150a, 15b. When the switch 100 is in a neutral position as in FIG. 3, the teeth 114a, 114b are clear of the central shaft 118, such that when the shaft 118 rotates in either direction, its notch or notches 116 do not engage either tooth 114a, 114b. When the switch 100 is 'switched on,' or rotated to make a circuit connection as illustrated in FIGS. 4A-4B, the tooth 114a or 114b of one of the pawls 104, 106 is pulled by the spring 112 toward the central shaft 118, and when the shaft 118 rotates so as to align a notch 116 with the tooth 114, the notch 116 will engage the tooth 114. As described below, this enables the self-cancelling feature.

Figure 5:
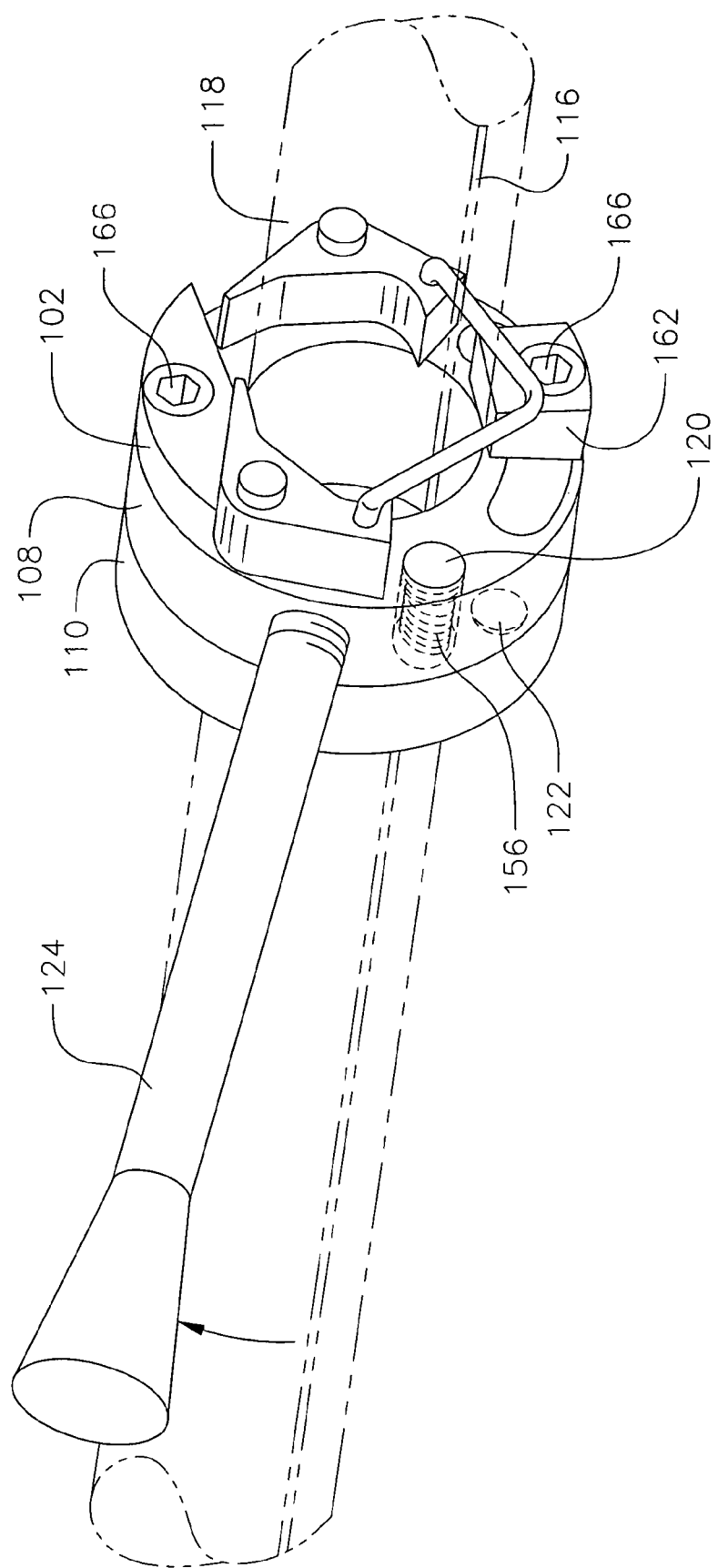
FIG. 5 is a perspective view showing a rotary switch in an engaged position according to an exemplary embodiment of the present invention.

In the neutral position, the switch 100 is disengaged. In one embodiment, a ball spring detent 156 is used to hold the switch 100 in the neutral or disengaged position. The ball spring detent 156 is a commonly used item well known in the state of the art. However, the invention is not limited to this detent mechanism. The ball spring is in a ball spring hole 120 in the rotary element 108. In the neutral position, illustrated in one embodiment in FIG. 3, the ball falls into a detent pit 122 in the stationary element 110. Thus, the ball spring detent 156 stably holds the rotary element 108 in the neutral, or disengaged position unless an external force, such as the user pushing the lever 124 is applied to rotate the rotary element 108 relative to the stationary element 110. When, as illustrated in FIG. 5, the rotary element 108 is rotated to an engaged position, the ball compresses the spring and exits the detent pit 122.

The rotary switch 100 includes two engaged positions. According to an exemplary embodiment in which the rotary switch is utilized as a turn signal switch, a first engaged position connects a right turn signal 20 to a turn signal flasher 14, and a second engaged position connects a left turn signal 18 to the turn signal flasher 14. For example, as illustrated in FIG. 5, when the rotary element 108 is sufficiently rotated in a clockwise direction, it moves into the first engaged position and signals a right turn.

Figure 11:
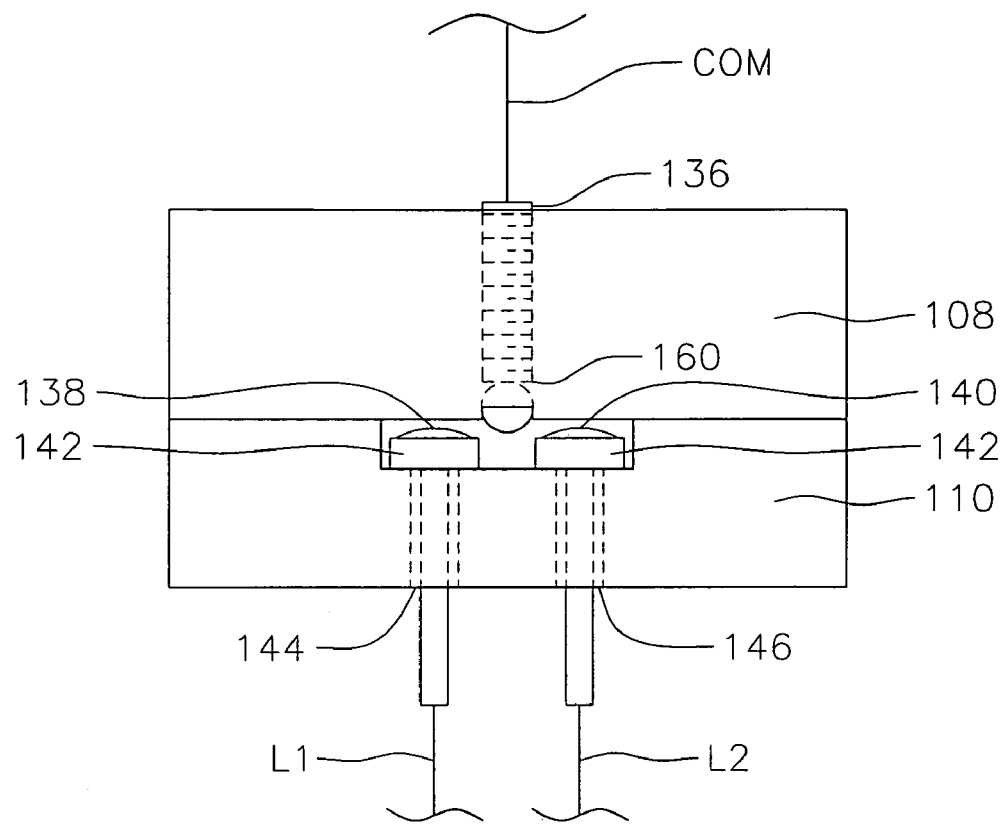
FIG. 11 is a view of a rotary switch giving details of the electrical contacts according to an exemplary embodiment of the present invention.

Referring now to FIG. 11, to close the switch, the pole COM can be a wire or other electrical terminal, and may be electrically connected to a second ball and spring 160 in a contact hole 136. The second ball and spring 160 may be similar to or the same as that used in the ball spring detent 156, but it is not limited thereto. The pole COM and the second ball and spring 160 should be insulated from the body of the rotary switch 100. In the closed or engaged position, the ball of the second ball and spring 160 makes contact with a head of an electrical contact pin 138, 140. The electrical contact pins 138, 140 pass through insulators 142 that pass through electrical contact holes 144, 146. The electrical contact pins 138, 140 are further connected to wires or other signal carriers that send the signal from the turn signal flasher 14 to either the left turn signal 18 or the right turn signal 20. The heads of the electrical contact pins 138, 140 may have a somewhat raised profile, such that the spring of the second ball and spring 160 exerts a force on the ball to maintain an electrical contact between the pole COM and the electrical contact pin 138 or 140.

To place the switch 100 in an engaged position (i.e., to connect the pole COM to either the first throw L1 or the second throw L2), a force is applied to the lever 124, which causes the rotary element 108 to rotate, rotationally sliding against the stationary element 110 and bringing the first ball out of the detent pit 122 in the stationary element 110. In the embodiment illustrated in FIGS. 3, 4A, and 4B, a downward force on the lever 124 causes the rotary element 108 to rotate in a counter-clockwise direction, and an upward force on the lever 124 causes the rotary element 108 to rotate in a clockwise direction. However, the present invention is not limited thereto. In the illustrated embodiment, the slot 128 in the outer tube 126 through which the lever 124 passes is large enough to allow the rotary element 108 to rotate enough to fully enter either engaged position, but the slot 128 is small enough to act as a stop, preventing the rotary element 108 from rotating past either engaged position. Once the switch 100 is in either engaged position, it remains in that position by friction between various parts of the switch 100, for example, between the first ball and the stationary element 110, between the second ball and one of the electric contact pins, or between a pawl tooth 114 and the central shaft 118.

Each of the pawls 104, 106 is pivotally attached to the rotary element 108 by a dowel pin 152, 154 in a pivot hole 132. When the rotary element 108 rotates, because the pawls 104, 106 are pivotally attached to the rotary element 108, they move along with it, revolving around the center of rotation of the rotary element 108. In the embodiment illustrated in FIGS. 3 and 4A, as the rotary element 108 rotates in the clockwise direction, the first ramp 148 on the ramp cam 102 contacts with a tongue 150a projecting from the first pawl 104. As the first pawl 104 moves toward the ramp cam 102, the first ramp 148 pushes against the tongue 150a. The slope of the first ramp 148 is such that as it pushes against the tongue 150a, it causes the first pawl 104 to pivot about the first dowel pin 152 pivotally attaching the first pawl 104 to the rotary element 108. The spring 112 that couples the first pawl 104 to the second pawl 106 causes the second pawl 106 to pivot about the second dowel pin 154, pulling the tooth 114b of the second pawl 106 toward the central shaft 118. If the notch 116 in the central shaft 118 is not aligned with the tooth 114b of the second pawl 106, then the second pawl 106 may not pivot, but the spring 112 will apply a force to the second pawl 106 pulling the tooth 114b in the direction of the central shaft 118, and the spring 112 will expand. If and when the central shaft 118 rotates such that the notch 116 in the central shaft 118 aligns with the tooth 114b of the second pawl 106, the force of the expanded spring 112 will cause the second pawl 106 to pivot, and pull the tooth 114b of the second pawl 106 into the notch 116.

Once the tooth 114b of the second pawl 106 is in the notch 116, in the first engaged position as in FIG. 4A, as a torque is applied to the central shaft 118 (e.g. by turning an attached steering wheel) tending to make it rotate in a clockwise direction, a force between the upper edge of the notch 116 pushes against the upper edge of the tooth 114b of the second pawl 106. In FIG. 4A, the upper edge of the tooth 114b of the second tooth 106 is angled such that the direction of this force translates into a torque on the second pawl 106, tending to make the second pawl 106 pivot in a counter-clockwise direction as the tooth 114b of the second pawl 106 is pushed out of the notch 116. As the tooth 114b of the second pawl 106 is pushed out of the notch 116, the spring 112 expands, applying a counter-force, pulling the tooth 114b of the second pawl 106 toward the central shaft 118. However, aside from the relatively small force required to push the tooth 114 of the second pawl 106 out of the notch 116, the central shaft 118 is free to rotate in the clockwise direction without affecting the state of the rotary switch 100, which remains in the first engaged position.

When the tooth 114b of the second pawl 106 is in the notch 116, in the first engaged position in FIG. 4A, as a torque is applied to the central shaft 118 tending to make it rotate in a counter-clockwise direction, a force between the lower edge of the notch 116 pushes against the lower edge of the tooth 114b of the second pawl 106. In FIG. 4A, the lower edge of the tooth 114 of the second pawl 106 is angled so as to catch the lower edge of the notch 116. For example, in FIG. 4A, when the tooth 114b of the second pawl 106 is in the notch 116 in the first engaged position, the lower edge of the tooth 114b of the second pawl 106 extends approximately radially from the center of the central shaft 118. As the central shaft 118 rotates in the counter-clockwise direction, a force is applied to the second pawl 106 in a direction approximately toward the second dowel pin 154 about which the second pawl 106 pivots. Thus, the force generally does not cause the second pawl 106 to pivot. Rather, the force is translated into a force on the second dowel pin 154 that has a component in a tangential direction of rotation of the rotary element 108, which thereby causes the rotary element 108 to rotate in the counter-clockwise direction along with the central shaft 118. As the central shaft 118 continues to rotate in the counter-clockwise direction, the rotary element 108 thus similarly continues to rotate in the counter-clockwise direction. As the rotary element 108 rotates, the tongue 150b of the second pawl 106 contacts the second ramp 158 on the ramp cam 102. The second ramp 158 is angled such that as the tongue 150b pushes against it, it causes the second pawl 106 to pivot in a counter-clockwise direction, pulling the tooth 114b on the second pawl 106 away from the central shaft 118. As the second pawl 106 continues to pivot, and the tooth 114 of the second pawl 106 pulls away from the central shaft 118, the tooth 114b of the second pawl 106 eventually disengages from the notch 116. Thereafter, the central shaft 118 is free to rotate. As the second pawl 106 pivots and pulls its tooth 114b away from the central shaft 118, the spring 112 coupling the second pawl 106 to the first pawl 104 pulls on the first pawl 104, causing it to pivot in a counter-clockwise direction.

In FIG. 3, when the tooth 114b of the second pawl 106 has disengaged from the notch 116, the first pawl 104 and the second pawl 106 are symmetrically disposed such that both the tooth 114a of the first pawl 104 and the tooth 114b of the second pawl 106 are approximately equidistant from the surface of the central shaft 118. Further, when the tooth 114b of the second pawl 106 disengages from the notch 116, the first ball spring enters the detent pit 122, holding the rotary switch 100 in position. Thus, while clockwise rotation of the central shaft does not affect the state of the rotary switch in the first engaged position, counter-clockwise rotation of the central shaft causes the rotary switch to move from the first engaged position to the neutral position.

According to an exemplary embodiment of the present invention as illustrated in FIG. 5, the ramp cam 102 and a retainer 162 are positioned on the opposite face of the rotary element 108 from the stationary element 110, and are attached to the stationary element 110 by bolts 166 that pass through holes 168 in the rotary element 108. The bolts 166 are not tightened in such a manner as to prevent rotation of the rotary element 108, but are held in position using an adhesive or bonding agent on the threads in the stationary element 110. In this arrangement, the ramp cam 102 and the retainer 162 keep the rotary element 108 from moving away from the stationary element 110. Further, the rotary element 108 may include a recessed portion 164 that is positioned inside a central hole 166 in the stationary element 110, for further retaining the rotary element 108 in position relative to the stationary element 110.

Figure 12:
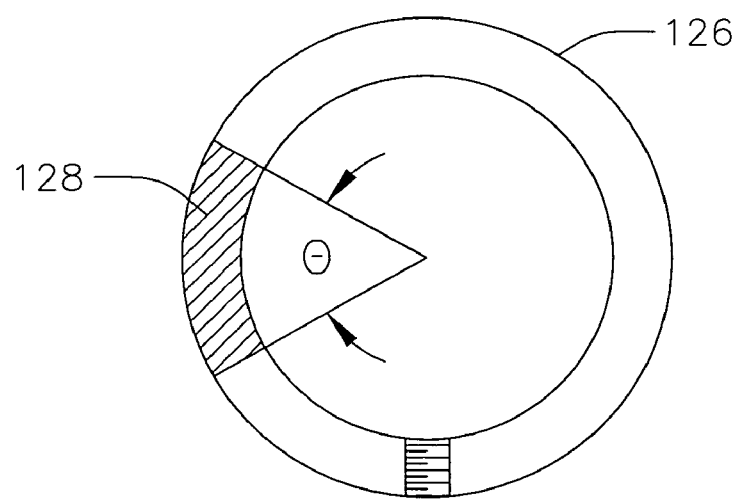
FIG. 12 is a schematic view showing the angle of a lever slot according to an exemplary embodiment of the present invention.

As described above, the rotary switch 100 may be positioned inside a tube 126 including a slot 128 through which the lever 124 passes. The lever 124 provides one means for rotating the rotary element 108 relative to the stationary element 110. The slot 128 is appropriately sized to protect the bolts 166 from being damaged by forceful rotation of the rotary element 108 by large forces on the lever 124. For example the angle Θ in FIG. 12 is limited to stop the lever 124, preventing the outer edges of the holes 168 from contacting the bolts 166 at the extremes.

Figure 13:
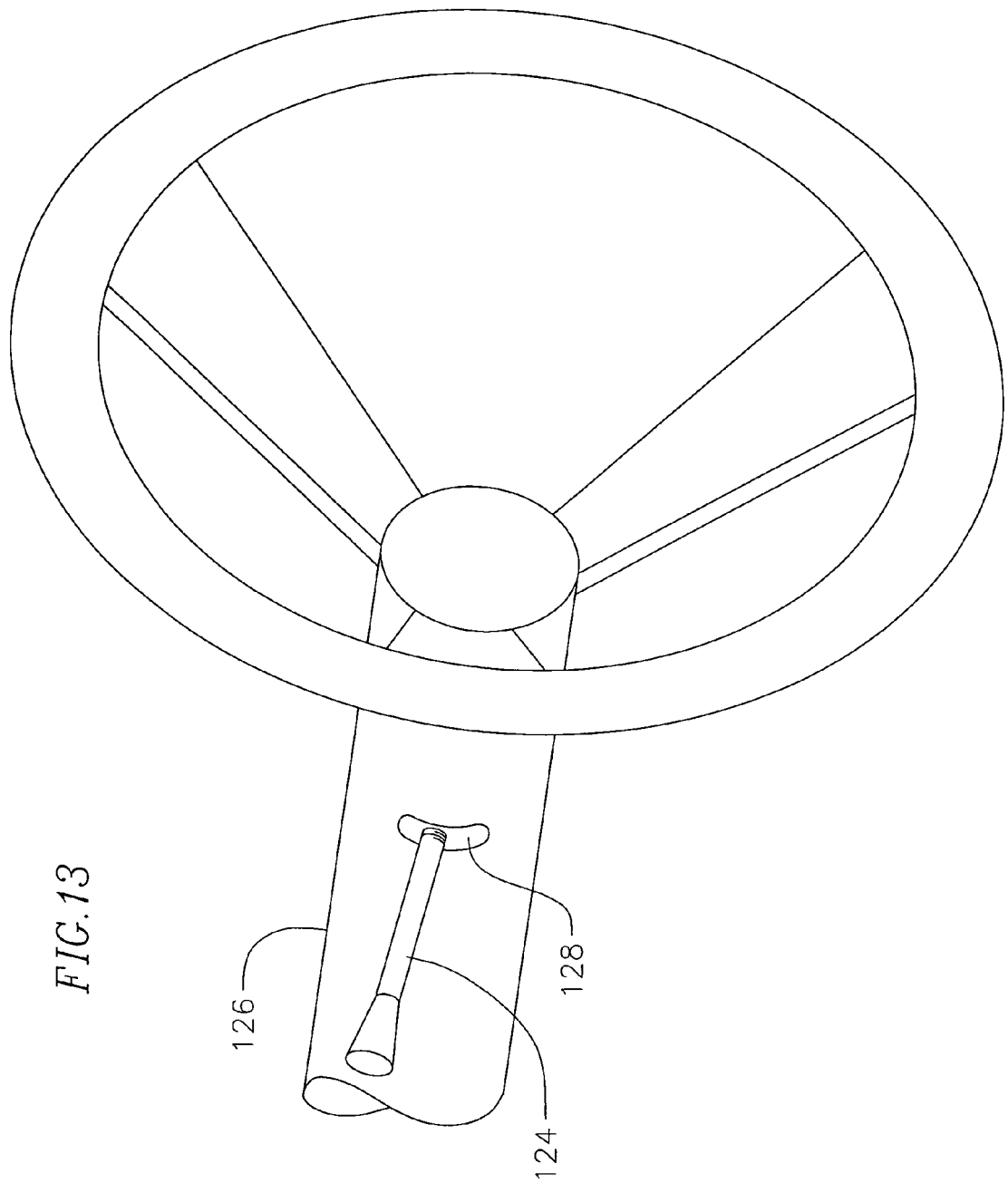
FIG. 13 is a perspective view of a steering wheel shaft utilizing an exemplary embodiment of the present invention.

As illustrated in FIG. 13, an exemplary embodiment of the present invention is utilized as a turn signal switch in a steering system of a motor vehicle. The steering column may include a horn, a steering wheel, a shaft, and other elements that may not be related to this invention. Various embodiments may position the lever 124 on the left side of the steering column, such that pushing the lever 124 up signals a right turn, and pushing it down signals a left turn. Or, the lever 124 may be positioned on the right side of the steering column, such that pushing the lever 124 up signals a left turn, and pushing it down signals a right turn. However, the invention is not limited thereto.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rotary switch for selectively coupling a first contact to a second contact or a third contact, comprising:
   a rotary element for controllably rotating among at least a first position coupling the first contact to the second contact, and a second position coupling the first contact to the third contact;
   a first pawl and a second pawl pivotally attached to the rotary element;
   a ramp cam for acting on the first and second pawl; and
   a spring coupling the first pawl to the second pawl, such that a pivoting motion of one pawl among the first and second pawls exerts a mechanical force tending to pivot the other pawl among the first and second pawls;
   wherein rotation of the rotary element toward the first position causes the ramp cam to act on the first pawl, pivoting the first pawl and exerting a force on the second pawl, tending to move a tooth of the second pawl toward a central shaft.

2. The rotary switch according to claim 1, wherein rotation of the rotary element toward the second position causes the ramp cam to act on the second pawl, pivoting the second pawl and exerting a force on the first pawl, tending to move a tooth of the first pawl toward the central shaft.

3. The rotary switch according to claim 2, wherein the central shaft comprises at least one notch, such that when the rotary element is in the first position, rotation of the central shaft in a first direction causes the tooth of the second pawl to engage the notch and rotate the rotary element out of the first position.

4. The rotary switch according to claim 3, wherein, when the rotary element is in the second position, rotation of the central shaft in a second direction causes the tooth of the first pawl to engage the notch and rotate the rotary element out of the second position.

5. The rotary switch according to claim 4, wherein the rotary element further includes a third position between the first position and the second position, in which the second contact and the third contact are open.

6. The rotary switch according to claim 5, further comprising a detent for holding the rotary element in the third position.

7. The rotary switch according to claim 6, further comprising a lever attached to the rotary element for selectively rotating the rotary element between the first position, the second position, and the third position.

8. The rotary switch according to claim 7, wherein the rotary switch is a turn signal switch in a motor vehicle, for controlling a left turn signal and a right turn signal.

9. The rotary switch according to claim 8, wherein the first position activates the left turn signal, the second position activates the right turn signal, and the third position is a neutral position.

10. The rotary switch according to claim 9, wherein the central shaft is coupled to a steering wheel.

11. The rotary switch according to claim 5, wherein the tooth of the first pawl and the tooth of the second pawl are clear of a locus of rotation of the central shaft when the rotary element is in the third position.

12. The rotary switch according to claim 5, wherein rotation of the central shaft in the second direction when the rotary element is in the second position causes the rotary element to move to the third position.

13. The rotary switch according to claim 12, wherein rotation of the central shaft in the first direction when the rotary element is in the first position causes the rotary element to move to the third position.

14. The rotary switch according to claim 13, wherein the rotary element remains in the first position when the central shaft rotates in the second direction.

15. The rotary switch according to claim 14, wherein the rotary element remains in the second position when the central shaft rotates in the first direction.

16. A rotary switch for controlling an electrical coupling between a first contact and at least a second contact and a third contact, comprising:
   a rotary element for controllably rotating among at least three positions: a first position coupling the first contact to the second contact; a second position coupling the first contact to the third contact; and a third position between the first position and the second position, opening the first, second, and third contact;
   a first pawl and a second pawl pivotally attached to the rotary element and mechanically coupled together by a spring; and
   a ramp cam for acting on the first and second pawl,
   wherein rotation of the rotary element in a first direction from the third position to the first position causes the ramp cam to act on the first pawl, pivoting the first pawl, thereby exerting a force on the second pawl by action of the spring, tending to move a tooth of the second pawl toward a central shaft; and rotation of the rotary element in a second direction from the third position to the second position causes the ramp cam to act on the second pawl, pivoting the second pawl, thereby exerting a force on the first pawl by action of the spring, tending to move a tooth of the first pawl toward the central shaft;
   wherein the central shaft comprises a notch, such that rotation of the central shaft in the second direction when the rotary element is in the first position causes the at least one notch to engage the tooth of the second pawl and impart rotation in the second direction to the rotary element, moving the rotary element to the third position; rotation of the central shaft in the first direction when the rotary element is in the second position causes the at least one notch to engage the tooth of the first pawl and impart rotation in the first direction to the rotary element, moving the rotary element to the third position; and wherein the rotary element remains in the first position when the central shaft rotates in the first direction; the rotary element remains in the second position when the central shaft rotates in the second direction; and the rotary element remains in the third position when the central shaft rotates in either the first or the second direction.

17. A rotary switch for selectively coupling a first element to a second element or a third element, the switch comprising:

a stationary element;

a rotary element for operating the switch;

a cam attached to the stationary element;

a shaft for rotating in a central region of the rotary element, the shaft comprising at least one notch for canceling the switch;

a first pawl and a second pawl pivotally attached to the rotary element, the first pawl and the second pawl each comprising a tooth for engaging the at least one notch, and a tongue for engaging the cam; and a spring coupling the first pawl to the second pawl, adapted to couple pivoting motion of the first pawl with pivoting motion of the second pawl;

wherein the rotary element is adapted to be selectively positioned in at least a first position, a second position, and a third position, the first position disconnecting the first element from both the second element and the third element; the second position coupling the first element with the second element; and the third position coupling the first element with the third element;

wherein moving the rotary element from the first position to the second position brings the tongue of the first pawl into contact with the cam, pivoting the first pawl and thereby pivoting the second pawl to bring the tooth of the second pawl into a position where the at least one notch in the shaft engages the tooth of the second pawl when the shaft is rotated to align the at least one notch with the tooth of the second pawl;

wherein moving the rotary element from the first position to the third position brings the tongue of the second pawl into contact with the cam, pivoting the second pawl and thereby pivoting the first pawl to bring the tooth of the first pawl into a position where the at least one notch in the shaft engages the tooth of the first pawl when the shaft is rotated to align the at least one notch with the tooth of the first pawl; and wherein rotation of the shaft in a first direction moves the rotary element from the second position to the first position, but allows the rotary element to remain in either the first position or the third position, and rotation of the shaft in a second direction moves the rotary element from the third position to the first position, but allows the rotary element to remain in either the first position or the second position.

18. The rotary switch according to claim 17, further comprising a lever attached to the rotary element for selectively moving the rotary element between the first position, the second position, and the third position.

19. The rotary switch according to claim 18, wherein the rotary switch is a turn signal switch in a motor vehicle, for controlling a left turn signal and a right turn signal.

* * * * *